United States Patent
Lou et al.

(10) Patent No.: US 9,680,930 B2
(45) Date of Patent: Jun. 13, 2017

(54) DATA COMMUNICATION SYSTEM FOR A STORAGE MANAGEMENT SYSTEM AND COMMUNICATION METHOD THEREOF

(71) Applicant: Celestica Technology Consultancy (Shanghai) Co., Ltd., Shanghai (CN)

(72) Inventors: Kangzhen Lou, Shanghai (CN); Huaiye Wang, Shanghai (CN)

(73) Assignee: CELESTICA TECHNOLOGY CONSULTANCY (SHANGHAI) CO., LTD., Shanghai (CN)

( * ) Notice: Subject to any disclaimer, the term of this patent is extended or adjusted under 35 U.S.C. 154(b) by 853 days.

(21) Appl. No.: 13/889,239

(22) Filed: May 7, 2013

(65) Prior Publication Data

US 2013/0297763 A1 Nov. 7, 2013

(30) Foreign Application Priority Data

May 7, 2012 (CN) .......................... 2012 1 0138271

(51) Int. Cl.
  G06F 13/12 (2006.01)
  G06F 13/38 (2006.01)
  H04L 29/08 (2006.01)
  G06F 13/40 (2006.01)

(52) U.S. Cl.
  CPC ........ *H04L 67/1097* (2013.01); *G06F 13/385* (2013.01); *G06F 13/4045* (2013.01); *G06F 2213/0016* (2013.01); *G06F 2213/0036* (2013.01)

(58) Field of Classification Search
  None
  See application file for complete search history.

(56) References Cited

U.S. PATENT DOCUMENTS

| | | | |
|---|---|---|---|
| 6,351,819 B1* | 2/2002 | Berglund et al. | 713/310 |
| 8,069,257 B1* | 11/2011 | Bhatia | G06F 13/105 345/501 |
| 2002/0054477 A1* | 5/2002 | Coffey | G06F 11/0727 361/679.45 |
| 2003/0005367 A1* | 1/2003 | Lam | 714/42 |
| 2003/0093721 A1* | 5/2003 | King et al. | 714/42 |
| 2004/0019821 A1* | 1/2004 | Chu et al. | 714/6 |
| 2006/0224708 A1* | 10/2006 | Hawkins | 709/222 |
| 2007/0169081 A1* | 7/2007 | Zhao et al. | 717/168 |
| 2007/0255430 A1* | 11/2007 | Sharma et al. | 700/20 |
| 2009/0113195 A1* | 4/2009 | Mohrmann | G06F 9/4408 713/2 |
| 2009/0207862 A1* | 8/2009 | Underwood | H04L 69/24 370/498 |

(Continued)

*Primary Examiner* — Henry Tsai
*Assistant Examiner* — Christopher Bartels
(74) *Attorney, Agent, or Firm* — Novick, Kim & Lee, PLLC; Jae Youn Kim

(57) ABSTRACT

The present invention relates to a data communication system for storage management, the system comprises a storage management apparatus, an expander enclosure SCSI enclosure services (SES), the expander enclosure SES is connected to the storage management apparatus through a communication line, and a mainboard baseboard management controller (BMC), the mainboard BMC is connected to the expander enclosure SES through a communication medium, wherein each of the expander enclosure SES and the mainboard BMC has a instruction converting module.

13 Claims, 3 Drawing Sheets

(56) References Cited

U.S. PATENT DOCUMENTS

2010/0014514 A1* 1/2010 Slevert .................. 370/389
2013/0080697 A1* 3/2013 Dhandapani ........ G06F 11/3034
                                                                              711/114

* cited by examiner

DATA COMMUNICATION SYSTEM FOR A STORAGE MANAGEMENT SYSTEM AND COMMUNICATION METHOD THEREOF

CROSS REFERENCE TO RELATED APPLICATION

This application claims priority to PRC Patent Application No. 201210138271.4 filed on May 7, 2012.

BACKGROUND OF THE INVENTION

The present invention relates to a system for data communication and a communication method using the system; and more particularly, the present invention relates to a communication system between a storage management system and a baseboard management controller (BMC), and a data communication method using the system.

A storage system is directed to a system which consists of various storage devices for programs and data storage, controlling parts and devices (hardware) as well as algorithms (software) for information dispatching management in a computer.

As the amount of information grows rapidly, more and more enterprises begin to choose storage systems for managing information. Furthermore, as the business and the amount of data increase, users' requirements on performances of the storage systems become ever higher. Accordingly, the storage systems are required to have, for example, better stability, a greater storage space, a faster response speed for storing and all-round storage management which is more user friendly.

Both the expander enclosure and the mainboard are integral parts of the storage system. The mentioned expander enclosure and mainboard have management hierarchies and systems respectively.

The SCSI enclosure services (SES) are hardware command services supported by the expander enclosure of the storage system. Through the SCSI enclosure services, the SCSI host can use SCSI commands to control devices (including hardware such as the expander enclosure, magnetic disks, fans, power supplies, etc.) in the expander enclosure and obtain device information thereof.

The baseboard management controller (BMC) which is a dedicated services processor, supports the Intelligent Platform Management Interface (IPMI) and is used to monitor statuses of hardware devices on a mainboard of a computer. Furthermore, the BMC supports functions of local and remote diagnostics, console support, configuration management, hardware management and trouble-shooting.

Though the SES and the BMC can respectively manage hardware devices thereof, the SES and the BMC cannot communicate with each other. Consequently, to manage the system in a better manner, the storage management system must be compatible with command formats of both the SES and the IPMI. However, complexity of the storage management system may thus be enhanced.

Accordingly, it may be desirable to have a communication protocol between the SES and the BMC that allows the storage management system to manage hardware resources in a better and more convenient manner.

BRIEF SUMMARY OF THE INVENTION

Examples of the present invention may provide a data communication system for storage management, the system comprising a storage management apparatus, an expander enclosure SCSI enclosure services (SES), the expander enclosure SES is connected to the storage management apparatus through a communication line, and a mainboard baseboard management controller (BMC), the mainboard BMC is connected to the expander enclosure SES through a communication medium, wherein each of the expander enclosure SES and the mainboard BMC has a instruction converting module.

Some examples of the present invention may provide a communication method for a data communication system, the data communication system comprising a storage management apparatus, an expander enclosure SCSI enclosure services (SES) having an instruction converting module and a mainboard baseboard management controller (BMC) having an instruction converting module, the communication method comprising the following steps of sending, by the storage management apparatus, an SES request command to the expander enclosure SES through a communication line, converting, by the instruction converting module of the expander enclosure SES, the SES request command to a user-defined command A and sending, by the expander enclosure SES, the user-defined command A to the instruction converting module of the mainboard BMC, receiving the user-defined command A by the instruction converting module of the mainboard BMC through a communication medium, executing a corresponding operation to obtain corresponding information and sending a response instruction by the mainboard BMC, wherein the response instruction is converted to a user-defined command B by the instruction converting module of the mainboard BMC and the user-defined command B is then sent to the instruction converting module of the expander enclosure SES; and converting the user-defined command B to an SES response command after the user-defined command B is received and returning the SES response command to the storage management apparatus by the instruction converting module of the expander enclosure SES.

Other examples of the present invention may provide a communication method for obtaining mainboard baseboard management controller (BMC) information by means of only an expander enclosure SCSI enclosure services (SES), the communication method using a data communication system comprising a storage management apparatus, an expander enclosure SES having an instruction converting module and a mainboard BMC having an instruction converting module, the method comprising the following steps of sending, by the storage management apparatus, an SES request command to the expander enclosure SES through a communication line, converting, by the instruction converting module of the expander enclosure SES, the SES request command to a user-defined command A and sending, by the expander enclosure SES, the user-defined command A to the instruction converting module of the mainboard BMC, receiving the user-defined command A by the instruction converting module of the mainboard BMC through a communication medium, executing a corresponding operation to obtain corresponding information and sending a response instruction by the mainboard BMC, wherein the response instruction is converted to a user-defined command B by the instruction transformation module of the mainboard BMC and the user-defined command B is then sent to the instruction converting module of the expander enclosure SES, and converting the user-defined command B to an SES response command after the user-defined command B is received and returning the SES response command to the storage management apparatus by the instruction converting module of the expander enclosure SES.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
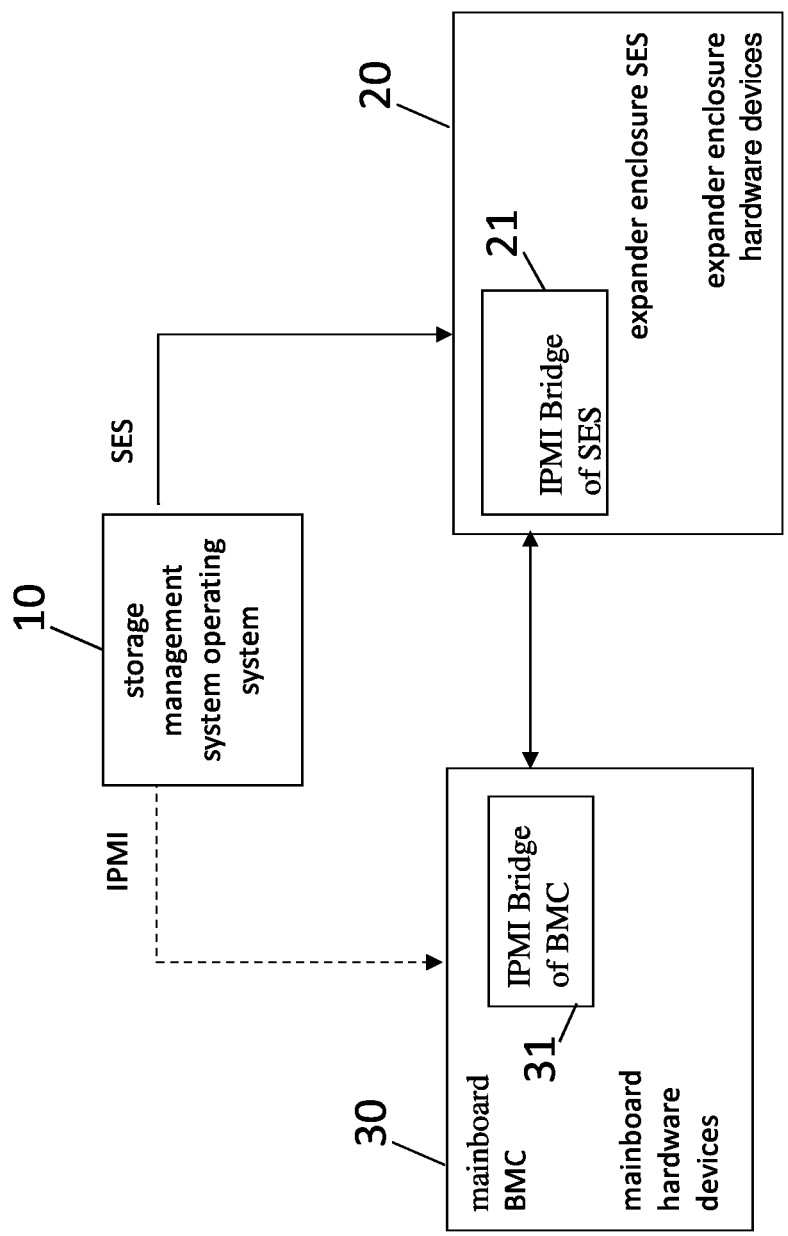
FIG. 1 is a logic diagram of communication between an expander enclosure SES and a mainboard BMC.

FIG. 1 is a logic diagram of communication between an expander enclosure SES 20 and a mainboard BMC 30. Referring to FIG. 1, the communication method of the present invention mainly relates to three units, e.g., a storage management system 10 executing on an operation system, an expander enclosure SCSI enclosure services (SES) 20, and a baseboard management controller (BMC) 30 on the mainboard (i.e., also referred to as "mainboard BMC"). The storage management system 10 and the expander enclosure SES 20 are connected to each other through a communication line, and the expander enclosure SES 20 and the mainboard BMC 30 are connected to each other through the I2C bus 40. The expander enclosure SES 20 are hardware command services supported by an expander enclosure of the storage system. Through the expander enclosure SES 20, the SCSI host can use SCSI commands to control devices (including hardware such as the expander enclosure, magnetic disks, fans, power supplies, etc.) in the expander enclosure and obtain device information thereof.

The mainboard BMC 30 which is a dedicated services processor, may support the Intelligent Platform Management Interface (IPMI) and is used to monitor statuses of hardware devices on a mainboard of a computer. Furthermore, the mainboard BMC 30 supports functions of local and remote diagnostics, console support, configuration management, hardware management and trouble-shooting.

The storage management system 10 can communicate with the expander enclosure SES 20 through the communication line. Moreover, a communication medium may be built between the expander enclosure SES 20 and the mainboard BMC 30. Through the communication medium, the expander enclosure SES 20 and the mainboard BMC 30 may communicate with each other.

Figure 2:
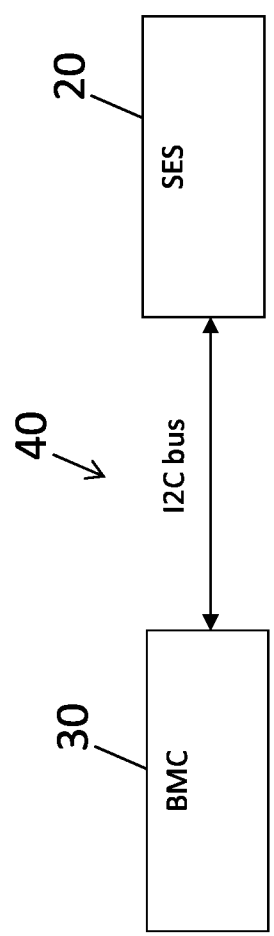
FIG. 2 is a schematic view of a communication medium between the expander enclosure SES and the mainboard BMC.

FIG. 2 is a schematic view of a communication medium between the expander enclosure SES 20 and the mainboard BMC 30. Referring to FIG. 2, the communication medium between expander enclosure SES 20 and the mainboard BMC 30 may include an I2C bus 40.

Referring back to FIG. 1, each of the expander enclosure SES 20 and the mainboard BMC 30 may have a instruction converting module IPMI Bridge. Before being sent out from the expander enclosure SES 20, instructions of the expander enclosure SES 20 may be converted by the IPMI Bridge module 21 thereof. Likewise, before being sent out from the mainboard BMC 30, instructions of the mainboard BMC 30 may be converted by the IPMI Bridge module 31 thereof. Thereby, communication between the expander enclosure SES 20 and the mainboard BMC 30 can be achieved. More particularly, the instructions converted by the IPMI Bridge modules 21 and 31 may be compatible with a set of user-defined communication message formats.

Referring to FIG. 2 again, through the I2C bus 40, the converted instructions can be directly recognized by the expander enclosure SES 20 and the mainboard BMC 30. Referring back to FIG. 1 again, the solid arrow represents a communication path of the present invention, and the dashed arrow represents a communication path which originally exists in the system but now has been removed. That is, in the communication path of the present invention, the IPMI communication path of the prior art is removed. Furthermore, information of the SCSI expander enclosure and the hardware on the mainboard can be obtained through direct communication between the expander enclosure SES 20 and the mainboard BMC 30, even though the storage management system 10 may only support the SES commands. Accordingly, the storage management system 10 may not need to support the IPMI commands, and the complexity of the storage management system 10 may thus be reduced.

Figure 3:
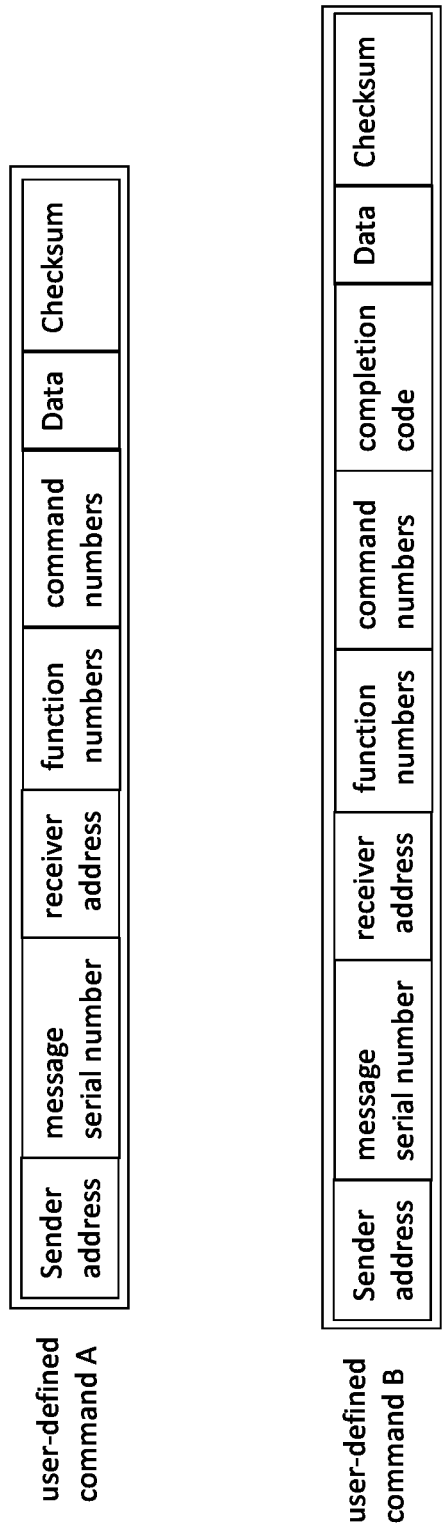
FIG. 3 is a schematic view illustrating formats of user-defined commands of communication messages of the expander enclosure SES and the mainboard BMC.

FIG. 3 is a schematic view illustrating formats of user-defined commands of communication messages of the expander enclosure SES 20 and the mainboard BMC 30. Referring to FIG. 3, the user-defined communication messages are classified as a user-defined command A and a user-defined command B. The user-defined command A includes a sender address, a message serial number, a receiver address, function numbers, command numbers, data and a checksum. On the other hand, the user-defined command B includes a sender address, a message serial number, a receiver address, function numbers, command numbers, a completion code, data and a checksum. Integral parts of the mentioned user-defined commands and meanings thereof are described as follows:

1. User-Defined Command A:

(a) The sender address:

The sender address may designate an address of a sender (e.g., given that the expander enclosure SES 20 sends a message to the mainboard BMC 30, an address of the expander enclosure SES 20 may be the sender address).

(b) The message serial number:

The message serial number may designate a message and accumulates from 0 to 255 circularly.

(c) The receiver address:

The receiver address may designate an address of a receiver (e.g., given that the expander enclosure SES 20 sends a message to the mainboard BMC 30, an address of the mainboard BMC 30 may be the receiver address).

(d) The function numbers and the command numbers:

The function numbers and the command numbers may designate a function of the communication message (e.g., a function of obtaining a temperature of a CPU on the mainboard). Various types of functions are provided, hence, all the functions may be classified. More particularly, based on the function numbers, the functions are firstly and generally classified as, for example, the system function classification, the log function classification and the like. As an embodiment of the present invention, the functions may be classified by reference to Table 1. As an alternative, the function numbers may be classified in any other similar manner, which may not affect the final result of the present invention. Furthermore, the function (e.g., the function of inquiring the temperature of the CPU, which belongs to the mentioned system function classification) of the communication message is located based on the command numbers (e) The data:

The mentioned "data" direct to "data for request messages," especially for request commands which must be executed with appended data.

(f) The checksum:

The checksum is used to verify the data integrity of a message.

TABLE 1

Classification of the function numbers

| Classification of functions | Function numbers (request/response) | Description |
| --- | --- | --- |
| Mainboard system functions | 00, 01 | Control/status information (e.g., temperature, voltage etc.) related to the mainboard system |
| Log functions | 02, 03 | Control/status information related to the log |
| Firmware functions | 04, 05 | Control/status information (e.g., firmware version, and firmware upgrading) related to the firmware information |
| Storage system functions | 06, 07 | Control/status information (e.g., hard disk information) related to the storage system |
| Other functions | 08, 09 | Other control/status information |
| Reserved functions | 10, 11 | Reserved for future use or expansion |

2. User-Defined Command B

The sender address and the receiver address in the user-defined command B have the same functions and constitutions as those in the user-defined command A. Furthermore, meanings and functions of several special fields in the user-defined command B are described as follows:

(a) The message serial number:

The message serial number is used to be paired with a request message and must be consistent with the message serial number in the user-defined command A. For example, if the serial number in the user-defined command A is 1, the corresponding message serial number in the user-defined command B is also 1.

(b) The function numbers:

The function numbers are used to be paired with the user-defined command A and must correspond to the function numbers in the user-defined command A in an one-to-one manner. Furthermore, each of the function numbers in the user-defined command B equals the corresponding function number in the user-defined command A plus 1 (e.g., if a function number in the user-defined command A is 0, the corresponding function number in the user-defined command B is 1).

(c) The command numbers:

The command numbers are used to be paired with the user-defined command A and must be consistent with the command numbers in the user-defined command A.

(d) The completion code:

The completion code may designate the status of the execution of the user-defined command A. Specifically, 0 represents that the user-defined command A is successfully executed. On the other hand, values other than 0 represent that errors occurred.

(e) The data:

The mentioned "data" direct to "data of the user-defined command B." Specifically, the data are valid if the completion code is 0. On the other hand, the data direct to specific error code if the completion code is a value other than 0. Accordingly, the completion code together with the data directing to specific error code, may constitute hierarchical error information In the following paragraphs, a first embodiment of the present invention is described. In the first embodiment, the storage management system 10 desires to obtain the temperature of the CPU on the mainboard. Specifically, the storage management system 10 may not directly send an IPMI command to the mainboard. Instead, the storage management system 10 may send an SES command to the expander enclosure SES 20. Furthermore, the expander enclosure SES 20 may communicate with the mainboard BMC 30, and the IPMI command is converted to the SES command supported by the storage management system 10, which is then returned to the storage management system 10. The detailed communication method is described as follows:

(a) sending, by the storage management system 10, an SES request command to the expander enclosure SES 20 through a communication line;

(b) converting, by the IPMI Bridge module 21 of the expander enclosure SES 20, the SES request command to a user-defined command A. The mentioned command includes the request information indicating that the storage management system 10 requests to obtain the temperature of the CPU on the mainboard. The format of the user-defined command A is shown in Table 2:

TABLE 2

Format of the user-defined command A

| Sender address | Message serial number | Receiver address | Function number | Command number | Data | Checksum |
| --- | --- | --- | --- | --- | --- | --- |
| SES address | 0 | BMC address | 0 | 00 | Data | Checksum |

(c) executing, by the mainboard BMC 30, a corresponding operation to obtain the temperature of the CPU after the user-defined command A is received. Next, sending, by the mainboard BMC 30, a response command. Next, converting, by the IPMI Bridge module 31 of the mainboard BMC 30, the response command to a user-defined command B. Next, sending, by the IPMI Bridge module 31 of the mainboard BMC 30, the user-defined command B to the expander enclosure SES 20. The format of the user-defined command B is shown in Table 3:

TABLE 3

Format of the user-defined command B

| Sender address | Message serial number | Receiver address | Function number | Command number | Completion code | Data | Checksum |
|---|---|---|---|---|---|---|---|
| BMC address | 0 | SES address | 1 | 00 | 0 | Data | Checksum |

(d) converting, by the IPMI Bridge module 21 of the expander enclosure SES 20, the user-defined command B to an SES response command. Next, returning, by the expander enclosure SES 20, the SES response command to the storage management system 10.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A data communication system for storage management, the system comprising:
   a storage management apparatus;
   an expander enclosure SCSI enclosure services (SES), the expander enclosure SES being connected to the storage management apparatus through a communication line; and
   a mainboard baseboard management controller (BMC), the mainboard BMC being connected to the expander enclosure SES through a communication medium,
   wherein each of the expander enclosure SES and the mainboard BMC has an instruction converting module,
   wherein the instruction converting module comprises an Intelligent Platform Management Interface (IPMI) Bridge module,
   wherein the communication medium comprises an Inter-Integrated Circuit (I2C) bus,
   wherein before being sent out from the expander enclosure SES and being sent out from the BMC, instructions of the expander enclosure SES and the mainboard BMC are converted by the IPMI Bridge module.

2. The system of claim 1, wherein the instruction converting module of the expander enclosure SES converts a request command of the expander enclosure SES to a first type of user-defined command.

3. The system of claim 2, wherein the instruction converting module of the mainboard BMC converts a response command of the mainboard BMC to a second type of user-defined command.

4. A communication method for a data communication system, the data communication system comprising a storage management apparatus, an expander enclosure SCSI enclosure services (SES) having an instruction converting module and a mainboard baseboard management controller (BMC) having an instruction converting module, the communication method comprising the following steps of:
   (a) sending, by the storage management apparatus, an SES request command to the expander enclosure SES through a communication line;
   (b) converting, by the instruction converting module of the expander enclosure SES, the SES request command to a user-defined command A and sending, by the expander enclosure SES, the user-defined command A to the instruction converting module of the mainboard BMC;
   (c) receiving the user-defined command A by the instruction converting module of the mainboard BMC through a communication medium, executing a corresponding operation to obtain corresponding information and sending a response instruction by the mainboard BMC, wherein the response instruction is converted to a user-defined command B by the instruction converting module of the mainboard BMC and the user-defined command B is then sent to the instruction converting module of the expander enclosure SES; and
   (d) converting the user-defined command B to an SES response command after the user-defined command B is received and returning the SES response command to the storage management apparatus by the instruction converting module of the expander enclosure SES,
   wherein the instruction converting module comprises an Intelligent Platform Management Interface (IPMI) Bridge module,
   wherein the communication medium comprises an Inter-Integrated Circuit (I2C) bus,
   wherein before being sent out from the expander enclosure SES and being sent out from the BMC, instructions of the expander enclosure SES and the mainboard BMC are converted by the IPMI Bridge module.

5. The method of claim 4, wherein the user-defined command A comprises a sender address, a message serial number, a receiver address, function numbers and command numbers, data and a checksum.

6. The method of claim 5, wherein the function numbers are classified as: mainboard system function numbers 00 and 01, log function numbers 02 and 03, firmware function numbers 04 and 05, storage system function numbers 06 and 07, other function numbers 08 and 09 and reserved function numbers 10 and 11.

7. The method of claim 4, wherein the user-defined command B comprises a sender address, a message serial number, a receiver address, function numbers and command numbers, a completion code, data and a checksum.

8. The method of claim 7, wherein the function numbers are classified as: mainboard system function numbers 00 and 01, log function numbers 02 and 03, firmware function numbers 04 and 05, storage system function numbers 06 and 07, other function numbers 08 and 09 and reserved function numbers 10 and 11.

9. A communication method for obtaining mainboard baseboard management controller (BMC) information by means of only an expander enclosure SCSI enclosure services (SES), the communication method using a data communication system comprising a storage management apparatus, an expander enclosure SES having an instruction converting module and a mainboard BMC having an instruction converting module, the method comprising the following steps of:
  (a) sending, by the storage management apparatus, an SES request command to the expander enclosure SES through a communication line;
  (b) converting, by the instruction converting module of the expander enclosure SES, the SES request command to a user-defined command A and sending, by the expander enclosure SES, the user-defined command A to the instruction converting module of the mainboard BMC;
  (c) receiving the user-defined command A by the instruction converting module of the mainboard BMC through a communication medium, executing a corresponding operation to obtain corresponding information and sending a response instruction by the mainboard BMC, wherein the response instruction is converted to a user-defined command B by the instruction transformation module of the mainboard BMC and the user-defined command B is then sent to the instruction converting module of the expander enclosure SES; and
  (d) converting the user-defined command B to an SES response command after the user-defined command B is received and returning the SES response command to the storage management apparatus by the instruction converting module of the expander enclosure SES,
  wherein the instruction converting module comprises an Intelligent Platform Management Interface (IPMI) Bridge module,
  wherein the communication medium comprises an Inter-Integrated Circuit (I2C) bus,
  wherein before being sent out from the expander enclosure SES and being sent out from the BMC, instructions of the expander enclosure SES and the mainboard BMC are converted by the IPMI Bridge module.

10. The method of claim 9, wherein the user-defined command A comprises a sender address, a message serial number, a receiver address, function numbers and command numbers, data and a checksum.

11. The method of claim 10, wherein the function numbers are classified as: mainboard system function numbers 00 and, 01; log function numbers 02 and 03, firmware function numbers 04 and 05, storage system function numbers 06 and 07, other function numbers 08 and 09 and reserved function numbers 10 and 11.

12. The method of claim 9, wherein the user-defined command B comprises a sender address, a message serial number, a receiver address, function numbers and command numbers, a completion code, data and a checksum.

13. The method of claim 12, wherein the function numbers are classified as: mainboard system function numbers 00 and, 01, log function numbers 02 and 03, firmware function numbers 04 and 05, storage system function numbers 06 and 07, other function numbers 08 and 09 and reserved function numbers 10 and 11.

\* \* \* \* \*